(12) United States Patent
Kennedy et al.

(10) Patent No.: US 10,167,075 B2
(45) Date of Patent: Jan. 1, 2019

(54) JOINT ASSEMBLY AND METHOD OF FORMING THEREOF

(71) Applicant: The Boeing Company, Seal Beach, CA (US)

(72) Inventors: Dennis K. Kennedy, Mesa, AZ (US); Zach K. Stahlecker, Chandler, AZ (US); Saul Opie, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 886 days.

(21) Appl. No.: 13/926,377

(22) Filed: Jun. 25, 2013

(65) Prior Publication Data

US 2014/0377076 A1 Dec. 25, 2014

(51) Int. Cl.
*B64C 11/26* (2006.01)
*F16B 11/00* (2006.01)
*B64C 27/473* (2006.01)

(52) U.S. Cl.
CPC ............ *B64C 11/26* (2013.01); *B64C 27/473* (2013.01); *F16B 11/002* (2013.01); *B64C 2027/4736* (2013.01); *Y10T 29/49337* (2015.01); *Y10T 403/4966* (2015.01)

(58) Field of Classification Search
CPC ....... B64C 11/20; B64C 11/26; B64C 27/463; B64C 27/473; B64C 2027/4733; B64C 2027/4736; F16B 11/002; Y10T 29/49337; Y10T 403/4966
See application file for complete search history.

(56) References Cited

U.S. PATENT DOCUMENTS

| | | | |
|---|---|---|---|
| 2,290,607 A | 7/1942 | De Lavaud | |
| 2,506,992 A * | 5/1950 | Bucher | B64C 11/20 29/889.61 |
| 2,535,917 A | 12/1950 | Gruetjen | |
| 2,544,450 A | 3/1951 | Enos | |
| 2,631,680 A | 3/1953 | Compte et al. | |
| 3,021,246 A * | 2/1962 | Hutter | B29C 70/28 156/196 |
| 3,028,292 A * | 4/1962 | Hinds | B29C 70/345 156/214 |

(Continued)

FOREIGN PATENT DOCUMENTS

| | | |
|---|---|---|
| CN | 1572654 A | 2/2005 |
| EP | 2347888 A2 | 7/2011 |

(Continued)

OTHER PUBLICATIONS

PCT International Preliminary Report on Patentability for related application PCT/US2014/032866 dated Jan. 7, 2016; 8 pp.

(Continued)

*Primary Examiner* — David E Sosnowski
*Assistant Examiner* — Wayne A Lambert
(74) *Attorney, Agent, or Firm* — Armstrong Teasdale LLP

(57) ABSTRACT

A joint assembly includes a first component formed from a first material and a second component including a portion that extends at least partially into the first component and that has an uneven outer profile. The first material is configured to form the first component into a shape that is substantially complementary to a shape of the portion to facilitate restricting movement of the second component in an axial direction.

20 Claims, 7 Drawing Sheets

(56) References Cited

U.S. PATENT DOCUMENTS

| | | | | |
|---|---|---|---|---|
| 3,664,764 | A * | 5/1972 | Davies | B29C 70/04 416/220 A |
| 3,721,507 | A * | 3/1973 | Monteleone | B64C 27/463 416/223 R |
| 3,765,124 | A * | 10/1973 | Ferris | B64C 27/473 416/226 |
| 3,782,856 | A * | 1/1974 | Salkind | B64C 27/473 416/226 |
| 3,989,280 | A * | 11/1976 | Schwarz | B29C 65/5042 285/239 |
| 4,022,546 | A * | 5/1977 | Drees | B64C 27/463 416/226 |
| 4,120,610 | A * | 10/1978 | Braswell | B64C 27/473 416/226 |
| 4,260,332 | A * | 4/1981 | Weingart | B64C 11/20 416/218 |
| 4,290,836 | A * | 9/1981 | McPherson | F16L 9/123 156/171 |
| 4,597,687 | A * | 7/1986 | Colas | B21D 39/044 182/228.6 |
| 5,233,737 | A * | 8/1993 | Policelli | F16L 47/16 285/390 |
| 5,320,494 | A * | 6/1994 | Reinfelder | B64C 27/463 156/701 |
| 5,392,514 | A * | 2/1995 | Cook | B29C 70/86 29/889.7 |
| 5,398,975 | A * | 3/1995 | Simmons | F16L 58/10 285/333 |
| 5,542,820 | A * | 8/1996 | Eaton | B64C 27/473 416/224 |
| 5,755,558 | A | 5/1998 | Reinfelder et al. | |
| 5,885,059 | A * | 3/1999 | Kovalsky | B64C 27/463 416/224 |
| 5,939,007 | A | 8/1999 | Iszczyszyn et al. | |
| 6,042,152 | A * | 3/2000 | Baldwin | F16L 9/12 285/222.1 |
| 6,659,722 | B2 | 12/2003 | Sehgal et al. | |
| 6,676,080 | B2 | 1/2004 | Violette | |
| 6,719,058 | B2 * | 4/2004 | Salama | E21B 17/01 166/242.2 |
| 6,863,279 | B2 * | 3/2005 | Salama | E21B 17/01 166/242.2 |
| 6,976,829 | B2 | 12/2005 | Kovalsky et al. | |
| 7,246,998 | B2 * | 7/2007 | Kovalsky | B64C 27/463 416/210 R |
| 7,654,799 | B2 * | 2/2010 | Eyb | F03D 1/0675 29/889.71 |
| 7,731,817 | B2 * | 6/2010 | Hethcock | B29C 53/40 156/258 |
| 7,798,780 | B2 * | 9/2010 | Bakhuis | F03D 1/0675 416/223 R |
| 7,976,275 | B2 * | 7/2011 | Miebach | F03D 1/001 416/212 R |
| 8,409,487 | B2 | 4/2013 | Dixon | |
| 8,500,407 | B1 | 8/2013 | Kennedy et al. | |
| 2002/0164251 | A1 * | 11/2002 | Sehgal | B64C 27/473 416/134 A |
| 2003/0156944 | A1 | 8/2003 | Rust | |
| 2005/0001424 | A1 * | 1/2005 | Watanabe | F16L 33/2073 285/256 |
| 2005/0013694 | A1 * | 1/2005 | Kovalsky | B64C 27/46 416/226 |
| 2009/0148303 | A1 * | 6/2009 | Leahy | B64C 27/463 416/226 |
| 2009/0269205 | A1 * | 10/2009 | Leahy | B64C 27/463 416/226 |
| 2012/0087801 | A1 | 4/2012 | Driver et al. | |
| 2012/0156050 | A1 | 6/2012 | White | |

FOREIGN PATENT DOCUMENTS

| | | |
|---|---|---|
| FR | 2855811 A1 | 12/2004 |
| GB | 2175973 A | 12/1986 |

OTHER PUBLICATIONS

PCT Search Report for related application PCT/US2014032866 dated Jul. 30, 2014, 12 pp.

European Office Action for related application 14727287.6-1754 dated Oct. 10, 2016; 6 pages.

China First Office Action for related application 2014800303657 dated Oct. 31, 2016; 20 pages.

European Office Action for related application 14727287.6-1754 dated Aug. 30, 2017; 5 pages.

Japanese Notice of Reasons of Rejection for related Application No. 2016-523728, dated Feb. 16, 2018, 6 pages.

\* cited by examiner

JOINT ASSEMBLY AND METHOD OF FORMING THEREOF

STATEMENT REGARDING FEDERALLY SPONSORED RESEARCH & DEVELOPMENT

This invention was made with Government support under Contract No. W911W6-07-D 0002-0020 ITRB Phase IV(E-ATTS TO 20) awarded by the Army. The Government has certain rights in this invention.

BACKGROUND

The field of the present disclosure relates generally to joint assemblies and, more specifically, to a mechanical joint that facilitates restricting movement between components thereof Recently, at least some known aircraft components have been fabricated from multi-layer laminate structures of non-metallic composite materials such as carbon-fiber-reinforced polymer (CFRP). The composite materials may be used in combination with metallic materials, such as aluminum, titanium, and/or steel, to reduce the weight of the aircraft. As used herein, the term "metallic" may refer to a single metallic material or a metallic alloy material. Reducing overall weight generally contributes to increasing the fuel efficiency of the aircraft.

Known composite-metallic hybrid structures may be implemented in a variety of applications in aircraft assemblies. For example, at least some known rotor blades include features that provide local masses along the span and the tip regions of the blade. The features may be used to modify the structural dynamic characteristics of the blade and/or enable weight balancing provisions to be incorporated into the blade to account for variations in blade mass resulting from manufacturing.

At least some known features are structurally bonded (i.e., an adhesive) into the blade or a blade spar assembly using a lap-shear joint. Ensuring the integrity of the structural bond generally requires inspection with a non-destructive inspection (NDI) based imaging technique. However, NDI may be a labor-intensive and costly process. As such, improving the manufacturing time of structures that use lap-shear joints and improving the reliability of the structural bonds used therein are becoming increasingly important.

BRIEF DESCRIPTION

In one aspect, a joint assembly is provided. The joint assembly includes a first component formed from a first material and a second component including a portion that extends at least partially into the first component and that has an uneven outer profile. The first material is configured to form the first component into a shape that is substantially complementary to a shape of the portion to facilitate restricting movement of the second component in an axial direction.

In another aspect, a spar assembly for use in a rotary blade system is provided. The assembly includes a body extending from a root portion to a tip portion and the body is formed from a first material. The assembly also includes a tip fitting including a portion that extends at least partially into the tip portion and that has an uneven outer profile. The first material is configured to form the body into a shape that is substantially complementary to a shape of the portion to facilitate restricting movement of the tip fitting in an axial direction.

In yet another aspect, a method of forming a joint assembly is provided. The method includes providing a first component formed from a first material, extending a portion of a second component at least partially into the first component, forming the first component about the second component. The portion has an uneven outer profile and the first material is configured to form the first component into a shape that is substantially complementary to a shape of the second component portion to facilitate restricting movement of the second component in an axial direction.

DETAILED DESCRIPTION

The implementations described herein relate to assemblies and methods that facilitate restricting axial movement between components of a joint assembly. In the exemplary implementation, the joint assembly includes a first component and a second component that include each features that interlock to facilitate forming a mechanical joint. More specifically, a portion of the first component that is at least partially insertable into the second component has an uneven outer profile, and the second component is formed from a material that conforms to a shape of the uneven outer profile. As such, the mechanical joint is formed between the first component and the second component that facilitates restricting axial movement between the components without the use of a film adhesive.

Figure 1:
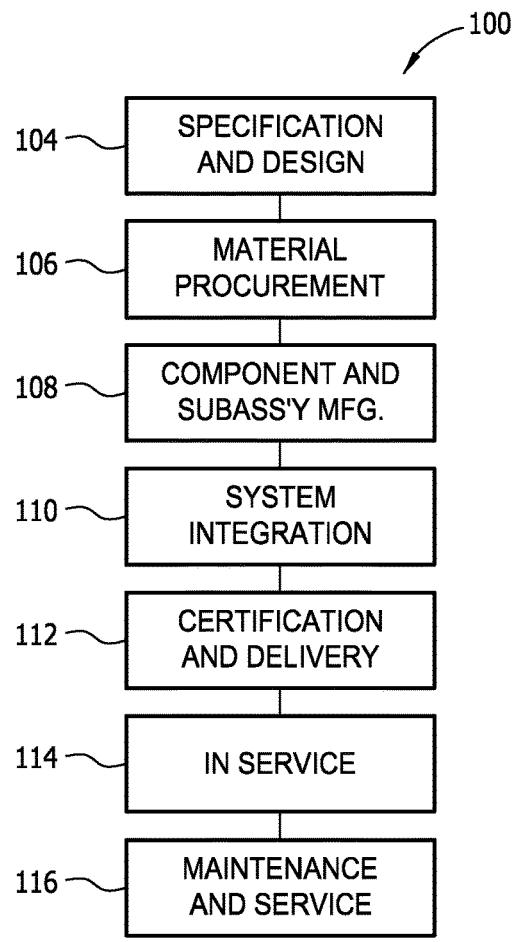
FIG. 1 is a flow diagram of an exemplary aircraft production and service methodology.
Figure 2:
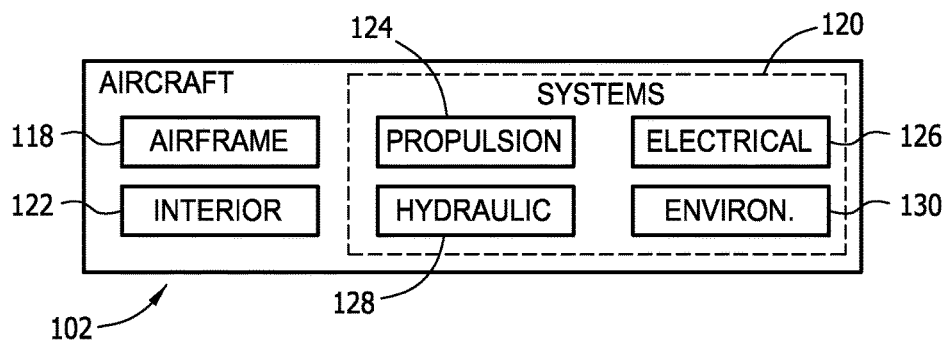
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included. Although an aircraft example is shown, the principles of the invention may be applied to non-aviation industries, such as the automotive industry.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels thorough airspace.

Figure 3:
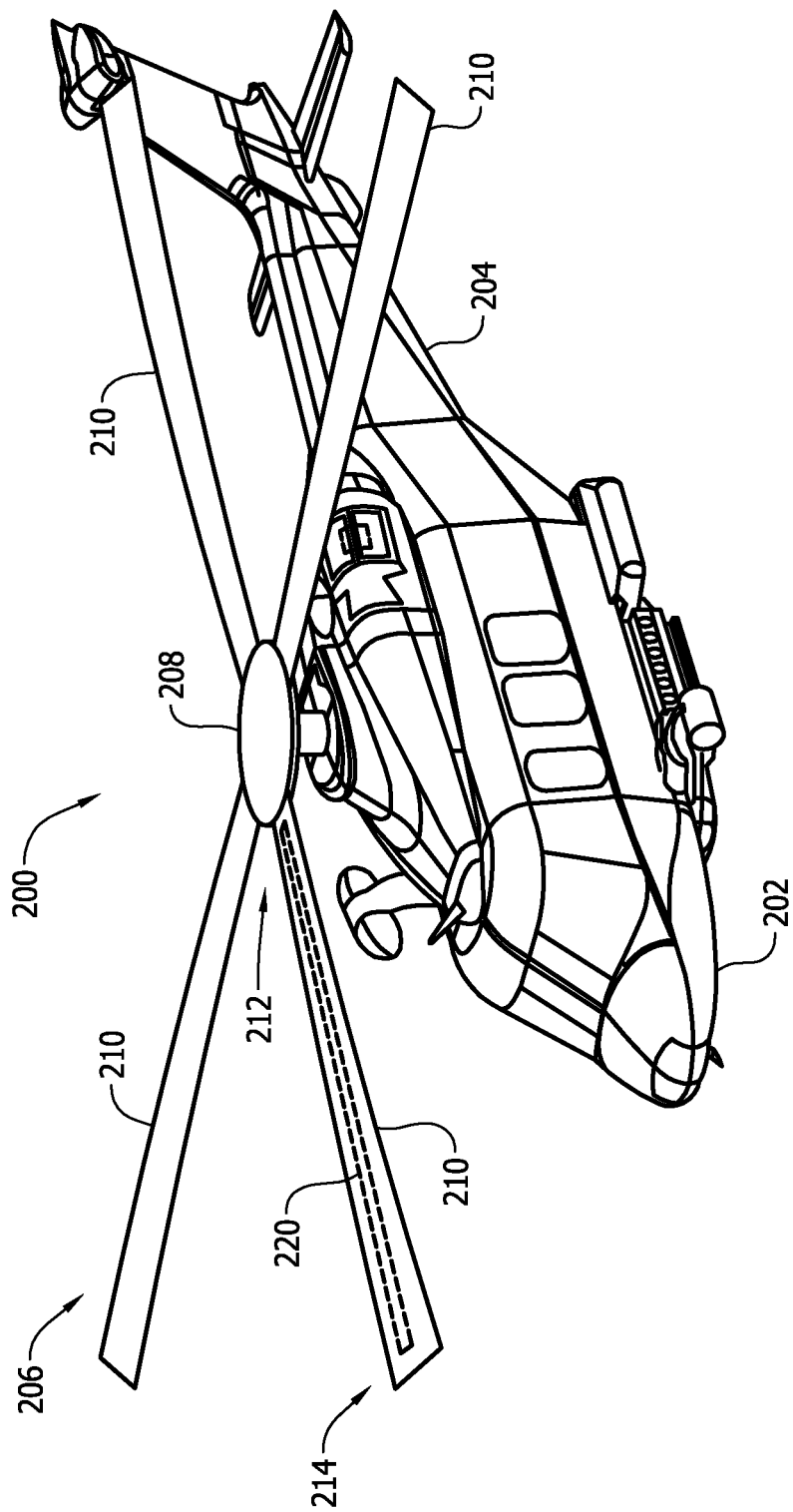
FIG. 3 is a perspective view of an exemplary helicopter.

FIG. 3 is a perspective illustration of an exemplary helicopter 200 that includes a fuselage 202, a tail boom 204 and a blade system 206. Blade system 206 includes a hub 208 rotor blades 210 that are coupled to hub 208. Rotor blades 210 include at least one spar assembly 220 that extends from a root portion 212 to a tip portion 214 of rotor blade 210. In the exemplary implementation, blade system 206 is configured for use with helicopter 200. In an alternative implementation, blade system 206 may be configured for use with any system requiring the use of a blade, including, but not limited to, aircraft and wind turbines.

Figure 4:
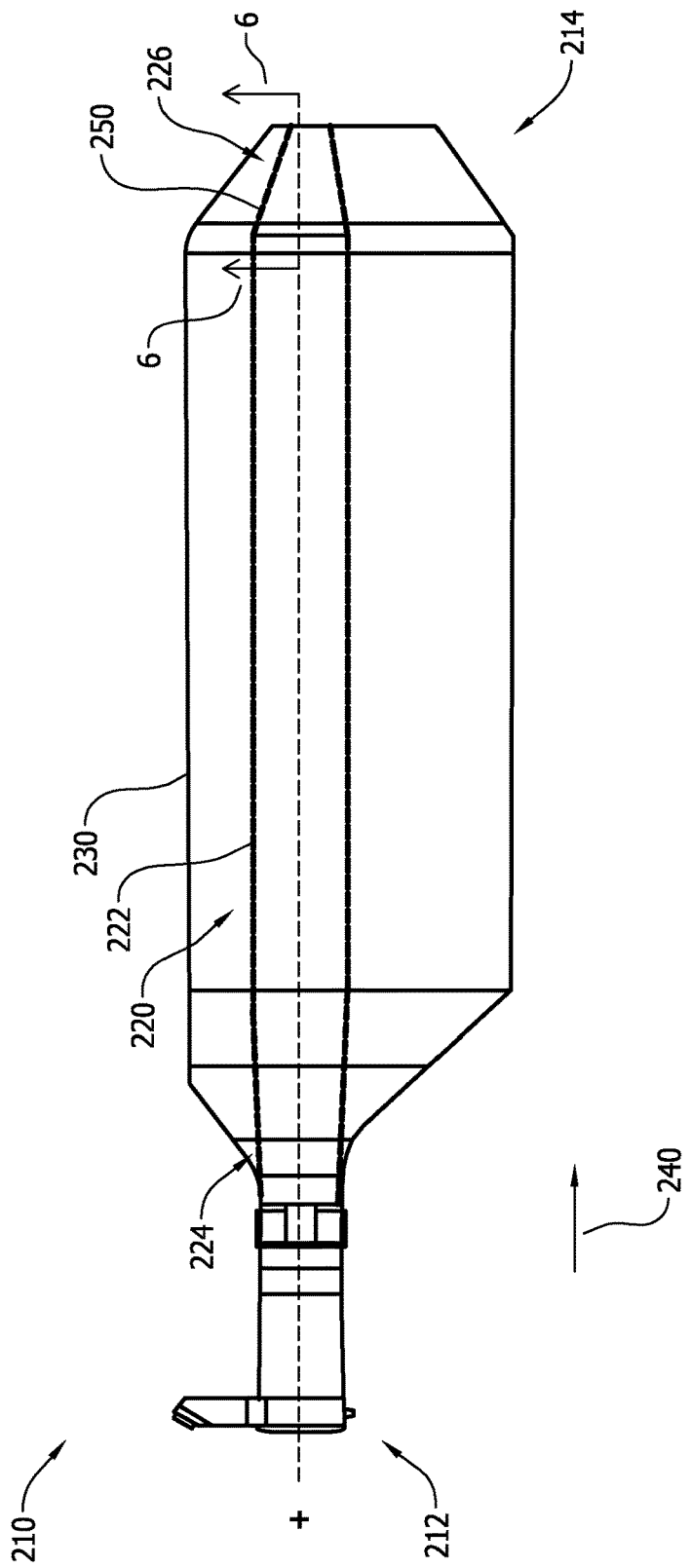
FIG. 4 is a perspective view of an exemplary rotor blade that may be used with the helicopter shown in FIG. 3.

FIG. 4 is a perspective view of rotor blade 210 that may be used with helicopter 200 (shown in FIG. 3). In the exemplary implementation, rotor blade 210 includes spar assembly 220 and an aerodynamically-shaped structural skin 230. Spar assembly 220 includes a body 222 and a tip fitting 250 coupled to body 222. Body 222 extends in a longitudinal direction 240 between a root portion 224 and a tip portion 226, and aerodynamically-shaped structural skin 230 is positioned about spar assembly 220. Spar assembly 220 has a substantially rectangular cross-sectional shape, and structural skin 230 has a cambered airfoil cross-sectional shape. In an alternative implementation, spar assembly 220 and structural skin 230 may have any cross-sectional shape that enables rotor blade 210 to function as described herein.

Figure 5:
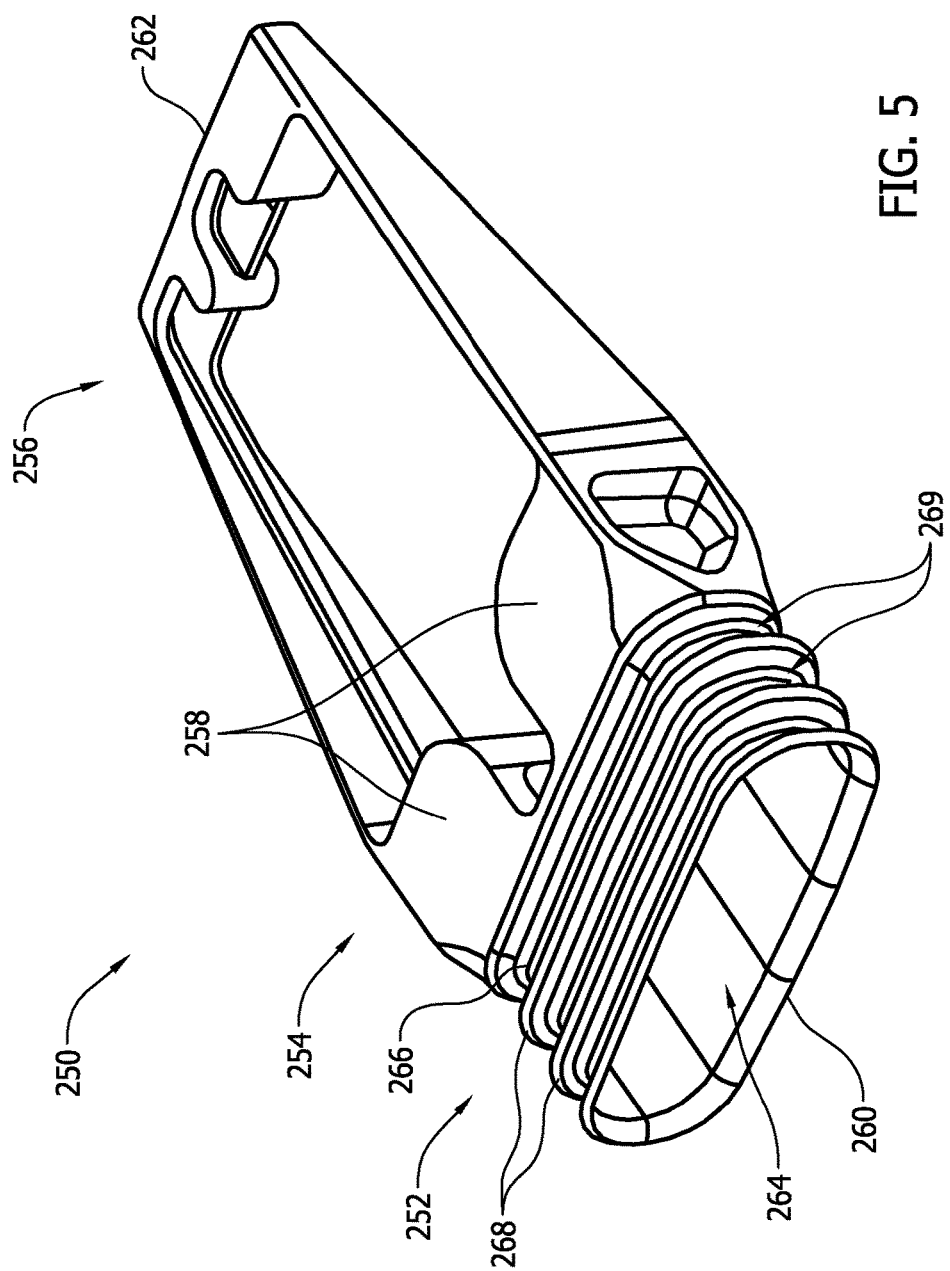
FIG. 5 is a perspective view of an exemplary tip fitting that may be used with the rotor blade shown in FIG. 4.

FIG. 5 is a perspective view of tip fitting 250 that may be used with spar assembly 220 (shown in FIG. 4). In the exemplary implementation, tip fitting 250 includes a first portion 252, a second portion 254, and a third portion 256. More specifically, first portion 252 is located at a first end 260 of tip fitting 250, third portion 256 is located at a second end 262 of tip fitting 250, and second portion 254 is located between first portion 252 and third portion 256. First portion 252 includes a hollow core 264 and an outer surface 266 that has an uneven outer profile. As will be described in more detail below, the uneven outer profile facilitates restricting movement of tip fitting 250 in longitudinal direction 240 (shown in FIG. 4) during rotor blade operation. Second portion 254 includes weight balancing receptacles 258 that facilitate reducing vibration in rotor blade 210 during operation. Weight balancing receptacles 258 are sized to enable insertion of adjustable weights (not shown) therein. As such, the adjustable weights facilitate compensating for variations in mass in rotor blade 210 resulting from manufacturing. Third portion 256 has a shape that is substantially similar to a shape of tip portion 214 (shown in FIG. 4). More specifically, third portion 256 reduces in thickness as it extends from second portion 254 to second end 262. In an alternative implementation, third portion 256 has any shape that enables tip fitting 250 to function as described herein. Further, in an alternative implementation, tip fitting 250 may only include first portion 252 and second portion 254.

Figure 6:
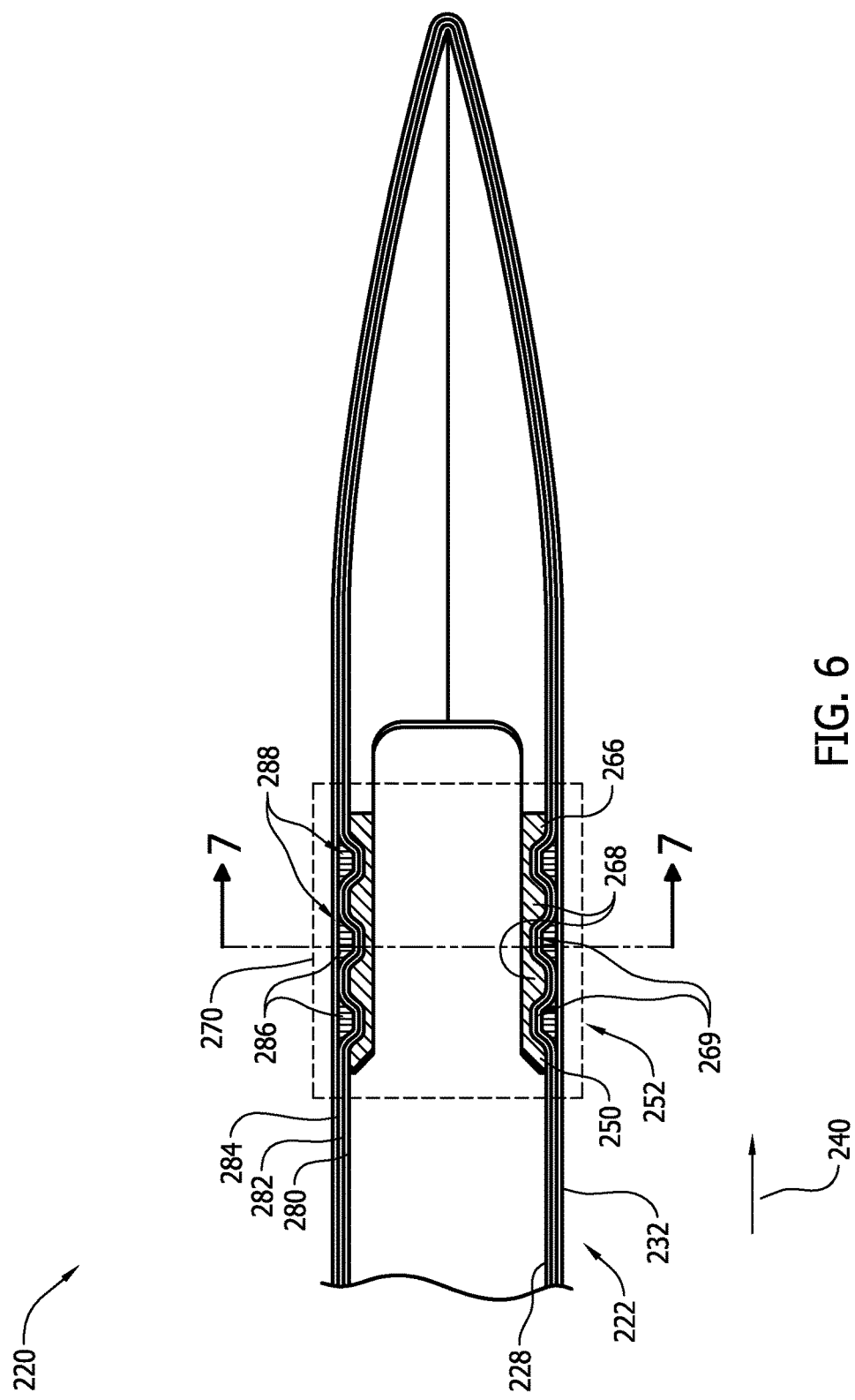
FIG. 6 is a cross-sectional view of an exemplary spar assembly that may be used with the rotor blade shown in FIG. 4 taken along line 6-6.
Figure 7:
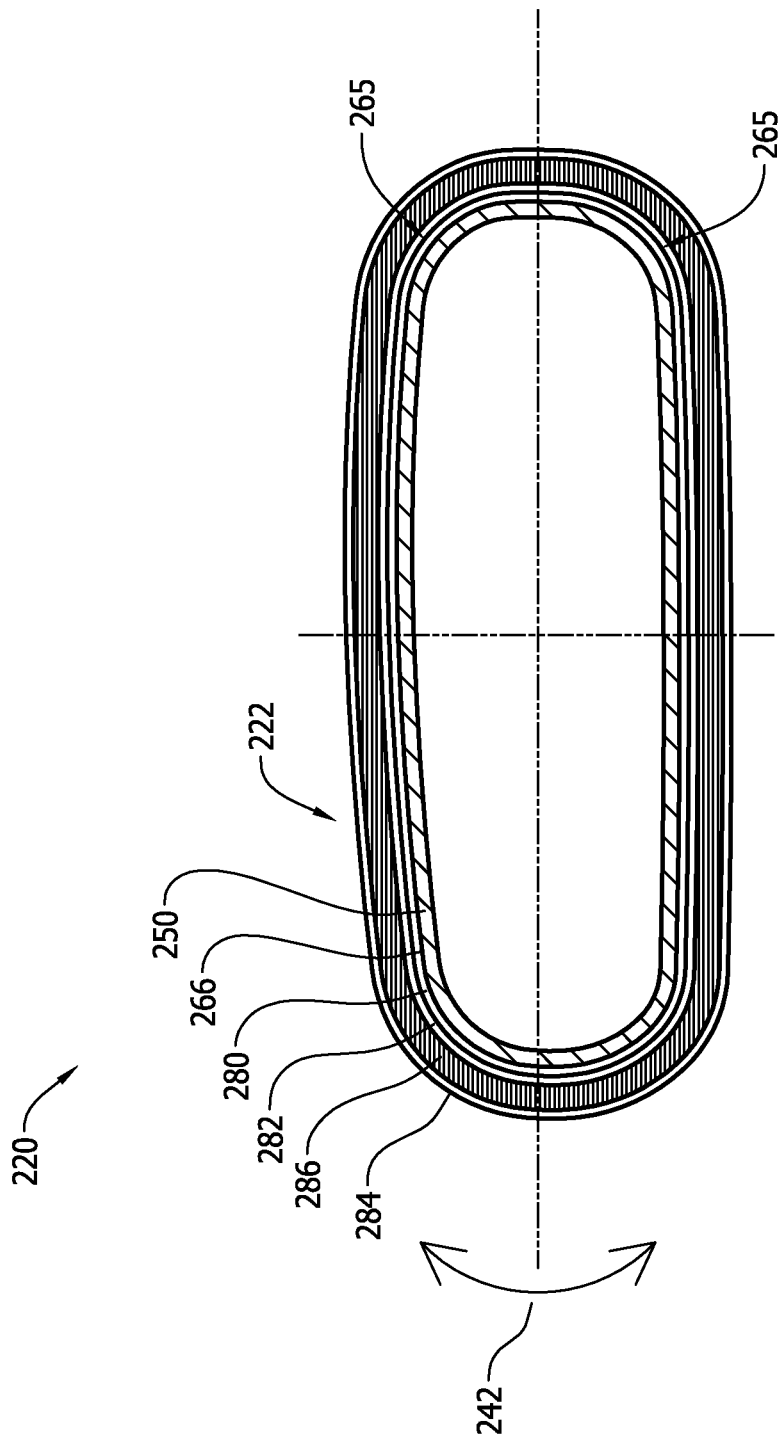
FIG. 7 is a cross-sectional view of the spar assembly shown in FIG. 6 taken along line 7-7.

FIG. 6 is a cross-sectional view of spar assembly 220 that may be used with rotor blade 210 taken along line 6-6 (shown in FIG. 4), and FIG. 7 is a cross-sectional view of spar assembly 220 taken along line 7-7. In the exemplary implementation, first portion 252 is coupled to body 222 to form a joint 270 that facilitates restricting axial movement of tip fitting 250 in longitudinal direction 240. For example, body 222 is formed such that an inner surface 228 of body 222 has a substantially complementary shape to the profile of outer surface 266. As such, first portion 252 of tip fitting 250 extends at least partially into body 222, and the interface between first portion 252 and body 222 facilitates restricting movement of tip fitting 250 in longitudinal direction 240.

Outer surface 266 may have any suitable profile that facilitates restricting movement of tip fitting 250 in longitudinal direction 240. For example, first portion 252 includes multiple retention members 268 that extend from outer surface 266 in a direction that is substantially perpendicular to longitudinal direction 240. A recess 269 is defined between adjacent pairs of retention members 268 and at least a portion of body 222 is insertable within each recess 269, as will be described in more detail below. In an alternative implementation, tip fitting 250 may include any number of retention members 268 that enable joint 270 to function as described herein. Further, in an alternative implementation, first portion 252 may increase in thickness as it extends from second portion 254 to first end 260 such that first portion 252 has a tapered cross-sectional shape.

In the exemplary implementation, body 222 is formed from a first layer 280 of material coupled to outer surface 266 of tip fitting 250, a second layer 282 of material positioned over first layer 280, and a third layer 284 of material positioned over second layer 282. Body 222 is also formed from a strip 286 of material that extends at least partially about tip fitting 250 in a hoop direction 242, and that is positioned between second and third layers 282 and 284 of material. Strips 286 facilitate increasing the strength of joint 270 and enable the shape of body 222 to be substantially complementary to the shape of tip fitting 250. More specifically, strips 286 extend circumferentially about tip fitting 250 within recesses 269. At least one strip 286 is sized for insertion into each recess 269 such that a portion of first layer 280 within each recess 269, a portion of second layer 282 within each recess 269, and each strip 286 form holding members 288 that facilitate restricting movement of tip fitting 250. Further, the portion of first layer 280, the portion of second layer 282, and strips 286 have a combined thickness that is substantially equal to a depth of each recess 269 such that body 222 has a substantially smooth outer surface 232. In alternative implementations, any number of layers of material may be used to form body 222, and the layers and strips may be positioned in any layup sequence and/or orientation that enables joint 270 to function as described herein.

In the exemplary implementation, body 222 is fabricated from a first material and tip fitting 250 is fabricated from a second material that is different than the first material. More specifically, layers 280, 282, and 284 and strips 286 are fabricated from a first material that may be flexible to facilitate complementing the shape of tip fitting 250. The first material may then harden to interlock body 222 with retention members 268 and to form joint 270. Exemplary first materials include, but are not limited to, fiber-reinforced polymer materials such as carbon fiber reinforced polymer (CFRP), and pre-impregnated composite material. More specifically, the first material may include tri-axial braided fiber-reinforced polymer material. Exemplary second materials include, but are not limited to, a metallic material, and a polymeric material. In an alternative implementation, the first material and the second material may be the same material. Further, in an alternative implementation, body 222 and tip fitting 250 may be fabricated from any material that enables spar assembly 220 to function as described herein. For example, strips 286 may be fabricated from a material that is different than the material used to fabricate layers 280, 282, and 284.

Tip fitting 250 may also have a cross-sectional shape that facilitates offsetting a torsional load that may be applied to tip fitting 250. More specifically, tip fitting 250 has a substantially non-circular shape to facilitate restricting movement of tip fitting 250 within body 222 in hoop direction 242. Further, outer surface 266 of first portion 252 has a substantially rounded cross-sectional shape to facilitate reducing stress concentrations applied to body 222. More specifically, first portion 252 has substantially rounded corners 265 to facilitate reducing stress concentrations applied to body 222 at and/or near corners 265 during operation. As such, using strips 286 to facilitate increasing the hoop strength of joint 270 and reducing stress concentrations in corners 265 facilitates increasing the strength of joint 270. In an alternative implementation, tip fitting 250 has any cross-sectional shape that enables tip fitting 250 to function as described herein.

Figure 8:
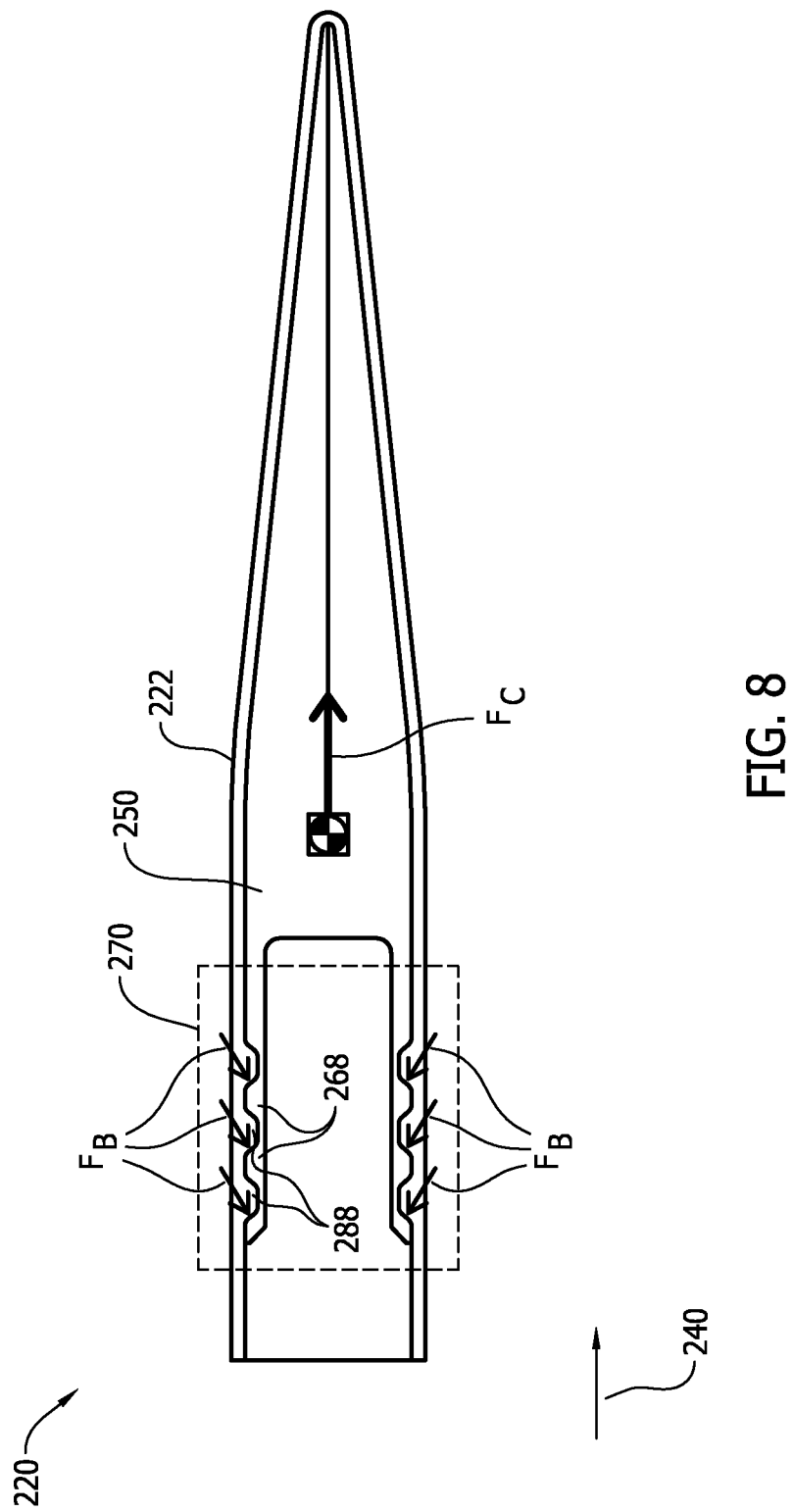
FIG. 8 is an alternative cross-sectional illustration of the spar assembly shown in FIG. 6.

FIG. 8 is an alternative cross-sectional illustration of the spar assembly 220. In operation, a centrifugal force $F_c$ is induced upon tip fitting 250 resulting from rotation of rotor blade 210 (shown in FIG. 3), and joint 270 facilitates restricting movement of tip fitting 250 resulting from centrifugal force $F_C$. More specifically, holding members 288 induce a bearing force $F_B$ upon retaining members 268 to facilitate restricting movement of tip fitting 250. Centrifugal force $F_C$ is directed in a substantially axial alignment with longitudinal direction 240, and bearing force $F_B$ is directed in a substantially opposing direction from centrifugal force $F_C$. For example, the direction of bearing force $F_B$ is based upon a geometry and/or configuration of retaining members 268 and complementary holding members 288. In an alternative implementation, a force may be induced upon tip fitting 250 in a direction opposite from centrifugal force $F_C$, and a second bearing force may be induced upon holding members 288 from retaining members 268 in an opposing direction from the induced force.

A method of forming a joint, such as joint 270, is also described herein. The method includes providing a first component, such as body 222, formed from a first material, and extending a portion of a second component, such as tip fitting 250, at least partially into the first component. The first component is then formed about the second component into a shape that is substantially complementary to a shape of the second component portion to facilitate restricting movement of the second component in an axial direction. The first component may be formed using a resin transfer molding (RTM) process to harden a material used to form the first component. As such, the first component and the second component form a unitary structure. Further, the first component and the second component interlock with an intimate fit to facilitate restricting movement of the second component during operation. As used herein, the term "intimate fit" means either an interference fit or a contact fit. In an alternative implementation, the first component may be formed using any suitable process that enables joint 270 to function as described herein such as fiber placement, hand layup of fabric, and/or unidirectional tape. Further, in an alternative implementation, a bond may be created between the first and second components by the resin used in the RTM process.

The assemblies and methods described herein enable a joint to be formed that facilitates restricting movement of the components therein relative to each other. More specifically, a first component of the joint includes retention features and a second component is formed from material that enables the second component to be formed into a shape that is substantially complementary to a shape of the first component. As such, the second component interlocks with the retention features to enable the joint to be formed without the use of an adhesive.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A joint assembly for use in a rotary blade system, said joint assembly comprising:
    a first component comprising:
        a plurality of layers formed from a first material; and
        a plurality of strips formed from a second material, wherein each strip of said plurality of strips is coupled between adjacent layers of said plurality of layers; and
    a second component comprising a portion that extends at least partially into said first component and that has an uneven outer profile, wherein said plurality of layers surrounds said second component such that an entirety of said second component is inward of said plurality of layers such that said second component is not exposed to an exterior environment, and wherein said second component comprises a plurality of retention members and a plurality of recesses defined between adjacent retention members, wherein a first layer of said plurality of layers is coupled to said plurality of retention members and positioned within said plurality of recesses, and wherein each strip of said plurality of strips is coupled to said first layer within a respective recess, wherein a second layer of said plurality of layers is coupled to said plurality of strips opposite said first layer such that said each strip is positioned between said first layer and said second layer.

2. The joint assembly in accordance with claim 1, wherein said second component comprises an outer surface from which said plurality of retention members extend to define the uneven outer profile, wherein the uneven profile defines a substantially sinusoidal shape.

3. The joint assembly in accordance with claim 2, wherein said plurality of retention members extend about an entire circumference of said second component portion along said outer surface.

4. The joint assembly in accordance with claim 1, wherein a portion of said first layer positioned within said each recess and said strip have a combined thickness that is substantially equal to a depth of said recess.

5. The joint assembly in accordance with claim 1, wherein said second material is different from the first material.

6. The joint assembly in accordance with claim 1, wherein the first material comprises a fiber-reinforced polymer material.

7. The joint assembly in accordance with claim 1, wherein said second component comprises at least one weight balance receptacle.

8. The joint assembly in accordance with claim 1, wherein said second layer comprises an outermost surface of said first component.

9. The joint assembly in accordance with claim 1, wherein said second layer is planar along an entire length of said potion of said second component.

10. The joint assembly in accordance with claim 1, said plurality of recesses are axially aligned with one another.

11. The joint assembly in accordance with claim 1, wherein said plurality of strips are axially aligned with one another, and wherein said plurality of strips are substantially similar to one another.

12. A spar assembly for use in a rotary blade system, said spar assembly comprising:
   a root portion;
   a tip portion spaced from said root portion;
   a body extending from said root portion to said tip portion, wherein said body comprises:
      a plurality of layers formed from a first material; and
      a plurality of strips formed from a second material, wherein each strip of said plurality of strips is coupled between adjacent layers of said plurality of layers; and
   a tip fitting comprising:
      a first portion that extends at least partially into said tip portion, said first portion comprising a plurality of retention members and a plurality of recesses defined between adjacent retention members such that said first portion includes an uneven outer profile that defines substantially sinusoidal shape, wherein a first layer of said plurality of layers is coupled to said plurality of retention members and positioned within said plurality of recesses, and wherein each strip of said plurality of strips is coupled to said first layer within each recess, wherein a second layer of said plurality of layers is coupled to said plurality of strips opposite said first layer such that said each strip is positioned between said first layer and said second layer, wherein said first portion comprises a hollow core; and
      a second portion adjacent said first portion, wherein said second portion is tapered to an end.

13. The spar assembly in accordance with claim 12, wherein the first material comprises a fiber-reinforced polymer material comprising a tri-axial braided fiber-reinforced polymer material and said tip fitting is formed from a metallic material.

14. The spar assembly in accordance with claim 12, wherein said body and said first portion interlock with an intimate fit to facilitate restricting movement of said tip fitting that is induced by a centrifugal force.

15. The spar assembly in accordance with claim 12, wherein said first layer contacts said outer second layer between adjacent strips of said plurality of strips.

16. A method of forming a joint assembly, said method comprising:
   providing a first component including a plurality of layers formed from a first material, and a plurality of strips formed from a second material;
   forming a second component including a plurality of retention members and a plurality of recesses defined between adjacent retention members;
   extending a portion of a second component at least partially into the first component, the portion having an uneven outer profile;
   coupling a first layer of the plurality of layers to the plurality of retention members and within the plurality of recesses;
   coupling a strip of said plurality of strips to the first layer within each recess;
   surrounding the second component and the plurality of strips with a second layer of the plurality of layers such that an entirety of the second component is inward of an entirety of the plurality of layers and the second component is not exposed to an exterior environment;
   wherein a first layer of said plurality of layers is coupled to said plurality of retention members and positioned within said plurality of recesses, and wherein each strip of said plurality of strips is coupled to said first layer within each recess, wherein a second layer of said plurality of layers is coupled to said plurality of strips opposite said first layer such that said each strip is positioned between said first layer and said second layer.

17. The method in accordance with claim 16, wherein extending a portion comprises fully inserting the second component into the first component.

18. The method in accordance with claim 16, wherein coupling the strip comprises extending the strip at least partially about an outer surface of the second component portion.

19. The method in accordance with claim 16, wherein surrounding the second component and the plurality of strips with the second layer of the plurality of layers comprises contacting the second layer to the first layer between adjacent strips of the plurality of strips.

20. The method in accordance with claim 16, wherein forming the second component comprises forming the second component such that the plurality of recesses are axially aligned with one another.

* * * * *